United States Patent [19]
Lapy et al.

[11] 4,163,972
[45] Aug. 7, 1979

[54] AUTOMATIC SHIPBOARD COLLISION AVOIDANCE SYSTEM

[76] Inventors: Viktor J. Lapy, ulitsa Chekistov, 24, kv. 16; Boris P. Chernov, prospekt 40-letia Oktyabrya, 100, kv. 228; Evgeny B. Georgizon, ulitsa Fedorova, 1, kv. 10; Anatoly A. Koshevoi, Tverskoi tupik, 9, kv. 62; Gerald I. Yavorsky, ulitsa Vasilkovskaya, 2, kv. 78; Valentin I. Glaziev, ulitsa Oktyabrskoi revoljutsii, 15/5, kv. 42, all of Kiev; Boris S. Rivkin, ulitsa Kuibysheva, 3, kv. 69; Andrei A. Yakushenkov, ulitsa V. Alexeeva, 9, kv. 37, both of Leningrad; Sergei F. Kurochkin, B. Simonovsky proezd, 11, kv. 66, Moscow, all of U.S.S.R.

[21] Appl. No.: 867,434

[22] Filed: Jan. 6, 1978

[51] Int. Cl.² ............................................. G01S 9/02
[52] U.S. Cl. .................................. 343/7 A; 343/7 AG
[58] Field of Search ............................ 343/7 A, 7 AG

[56] References Cited
U.S. PATENT DOCUMENTS

| 3,249,934 | 5/1966 | Hague | 343/7 A X |
| 3,786,506 | 1/1974 | Effinger et al. | 343/7 AG X |
| 3,845,481 | 10/1974 | Danzer et al. | 343/7 AG X |
| 4,104,631 | 8/1978 | Weigle et al. | 343/7 A |

Primary Examiner—T. H. Tubbesing
Attorney, Agent, or Firm—Lackenbach, Lilling & Siegel

[57] ABSTRACT

An automatic shipboard collision avoidance system comprises radar; a situation indicator connected to the radar receiver; a computer, which extracts target echoes from clutter and determines the coordinates and motion parameters of targets; an interface through which the computer is connected to the situation indicator; a target tracking gate unit connected via the interface to the computer and having a count pulse generator, a current range counter, range comparison circuits, a gate generator and a signal-half gate generator; a video signal encoder connected to the radar and, via said interface, to said computer and having a threshold circuit, a quantizer, a selector and a buffer storage. A control signal unit generates control signals to control the gain of the radar and sign characters of the count pulses and is connected through the interface to the computer. Usually, noise would be a problem in rough seas or in the presence of intense hydrometeors. By controlling the gain of the radar, different time distributions and different amplitudes of the unwanted echoes and the target echoes are taken into consideration. Thus, this system can insure increased noise immunity during automatic tracking of targets.

2 Claims, 3 Drawing Figures

AUTOMATIC SHIPBOARD COLLISION AVOIDANCE SYSTEM

FIELD OF THE INVENTION

The present invention relates to ship navigation means and, more particularly, to automatic shipboard collision avoidance systems.

The invention can be advantageously used for automation of navigation of both sea-going and river vessels.

BACKGROUND OF THE INVENTION

In the course of navigation of a ship the receiver of the radar installed thereon receives radar echoes from surface objects, which may present danger to the navigator's ship, and from the sea surface and hydrometeors as well.

Clutter in the form of unwanted echoes from the sea surface and hydrometeors adversely affects the stability of automatic target tracking in the collision avoidance system. Echoes from the sea surface and hydrometeors, in the case of high sea and intensive formation of the hydrometeors, become comparable in size with the target echoes. As a result, the collision avoidance system operates to detect spurious signals and masks true target echoes. Consequently, instead of the true target the system tracks clutter signals. The probability of the selection of the spurious signals depends on the clutter intensity, the established size of the tracking gate wherein the useful signals are detected, and on the adopted target detection criterion.

DESCRIPTION OF THE PRIOR ART

Known in the art are automatic shipboard collision avoidance systems comprising a situation indicator connected to radar having a receiver and a synchronizer. The situation indicator receives from the radar receiver video signals and presents the radar output containing information on the location of the surface objects in relation to the navigator's ship. Apart from this, the above systems comprise a video signal encoder having a series arrangement of a threshold circuit, a quantizer and a buffer storage. The video signal encoder has its input coupled to the radar receiver and its output coupled through an interface to a computer. The above systems comprise a target tracking gate unit having a count pulse generator with an output connected to a current target range counter. The current target range counter has an output connected to the input of a range comparison circuit. The range comparison circuit has an output connected to the input of a gate generator. The gate generator has an output connected to a second input of the quantizer.

The computer sends to the target tracking gate unit, by means of the interface, control signals to move the target tracking gate. In the known systems there is provided a control signal unit for generating control signals to control the gain of the radar receiver. The radar receiver is made as a superheterodyne with an intermediate frequency amplifier and a video amplifier connected thereto. The control signal unit amplification is connected through its first input to the output of said receiver, through its second input to the output of the target tracking gate unit, and through its output to the control input of the video amplifier.

The computer connected through the interface to the situation indicator operates to extract target echoes clutter and generates control signals for controlling the target tracking gate. In addition, the computer determines the coordinates and motion parameters of the targets, estimates the degree of danger of the approach therewith by comparing the generated approach parameters with permissible ones, and sends information on the targets being tracked to the situation indicator.

The situation indicator displays this information simultaneously with the radar data.

Decreasing the intensity of clutter in the above systems is achieved by automatic control of the target detection threshold in the threshold circuit of the video signal encoder. This automatic control is effected in accordance with the signals generated by the control signal unit related to the mean clutter level. To utilize to the fullest extent the dynamic range of the input signals of the radar receiver, the amplitude of the video signal, which is applied to the input of the threshold circuit, is also controlled. This is achieved by variation of the gain of the video amplifier by applying the receiver gain control signals to the control input of the video amplifier. Such control, however, has a low efficiency and does not ensure the required clutter immunity of the automatic target tracking channel, since the control of the video signal threshold does not take into account the difference between the useful signals and the noise and does not permit the dynamic range of the input pulses of the radar receiver (of the order of 80–100 dB) to be fully utilized, for the gain of the video amplifier can vary only in the range of 10–15 dB. Apart from this, other means of possible noise suppression are not utilized such as different time distribution and different amplitudes of the noise and the useful signals.

SUMMARY OF THE INVENTION

It is an object of the invention to provide an automatic shipboard collision avoidance system which can ensure an increased noise immunity of automatic tracking of targets, which would result during dangerous navigation situations under conditions of rough sea and in the presence of intense hydrometeors. This is achieved by means of adaptive control of the gain of the radar receiver in the target tracking gate so that different time distributions and different amplitudes of the unwanted echoes and the target echoes are taken into consideration.

It is another object of the invention to provide a more effective use of the dynamic range of the input signals of the radar receiver.

With these and other objects in mind, there is proposed an automatic shipboard collision avoidance system comprising radar having a receiver for receiving echoes from surface objects, said receiver being provided with an intermediate frequency amplifier, and a synchronizer; a situation indicator connected to the radar receiver and supplied therefrom with a video signal containing information on the coordinates of surface objects; a computer which extracts the target echoes from clutter, determines the coordinates and motion parameters of the targets and the approach parameters related to the navigator's ship, estimates the potential collision risk and sends information on the targets being tracked to the situation indicator; an interface through which the computer is connected to the situation indicator; a target tracking gate unit including a count pulse generator, a current range counter with its inputs connected to the synchronizer and to the count pulse generator, range comparison circuit with one input connected to the current range counter and with another input connected, through the interface, to the computer, and a gate generator with its inputs connected to two of the range comparison circuits. The target tracking gate unit is designed to generate a target tracking gate using the target coordinates received from the computer. A video signal encoder has a threshold circuit connected through its input to the radar receiver; a quantizer connected through its inputs to the output of the gate generator and to the output of the threshold circuit; and buffer storages connected through the interface to the computer. This video signal encoder is designed to convert analogue video signals received from the radar receiver into computer codes. A control signal unit generates control signals to control the gain of the radar receiver and has an output connected to the radar receiver. According to the invention, two of the range comparison circuits have outputs connected to a signal half-gate generator, one of the range comparison circuits being connected both to the input of the gate generator and to the input of the signal half-gate generator. The video signal encoder has a selector having a first input connected to the output of the quantizer and a second input connected to the output of the signal half-gate generator. The video signal encoder is designed to send to the computer video signal codes from the output of a first buffer storage in the absence of the signal half-gate and from the output of a second buffer storage in the presence of the signal half-gate. The control signal unit has a count pulse sign character driver which has its inputs connected, through the interface, to the computer and which receives therefrom information about the presence or absence of the target in the noise and signal half-gates; and, a threshold level generator having a bidirectional counter whose counting input is connected through the interface to the computer and whose sign input is connected to the output of the count pulse sign character driver. The bidirectional counter is designed to generate a control signal code proportional to the required gain of the intermediate frequency amplifier of the radar receiver in the target tracking gate according to the count pulses accepted by the counting input, whose number is proportional to the required gain of the intermediate-frequency amplifier of the radar receiver, and according to the count pulse sign character. A number-to-voltage converter of the threshold level generator has inputs connected to the target tracking gate unit and to the output of the bidirectional counter. It is designed to convert codes contained therein into a voltage proportional to the required gain of the intermediate frequency amplifier during the target tracking gate, the intermediate frequency amplifier being provided with a controllable gain and a control input connected to the output of the number-to-voltage converter.

BRIEF DESCRIPTION OF THE DRAWINGS

Other objects and advantages of the present invention will become evident from the following description of its embodiment with reference to the accompanying drawings in which.

DESCRIPTION OF THE INVENTION

Figure 1:
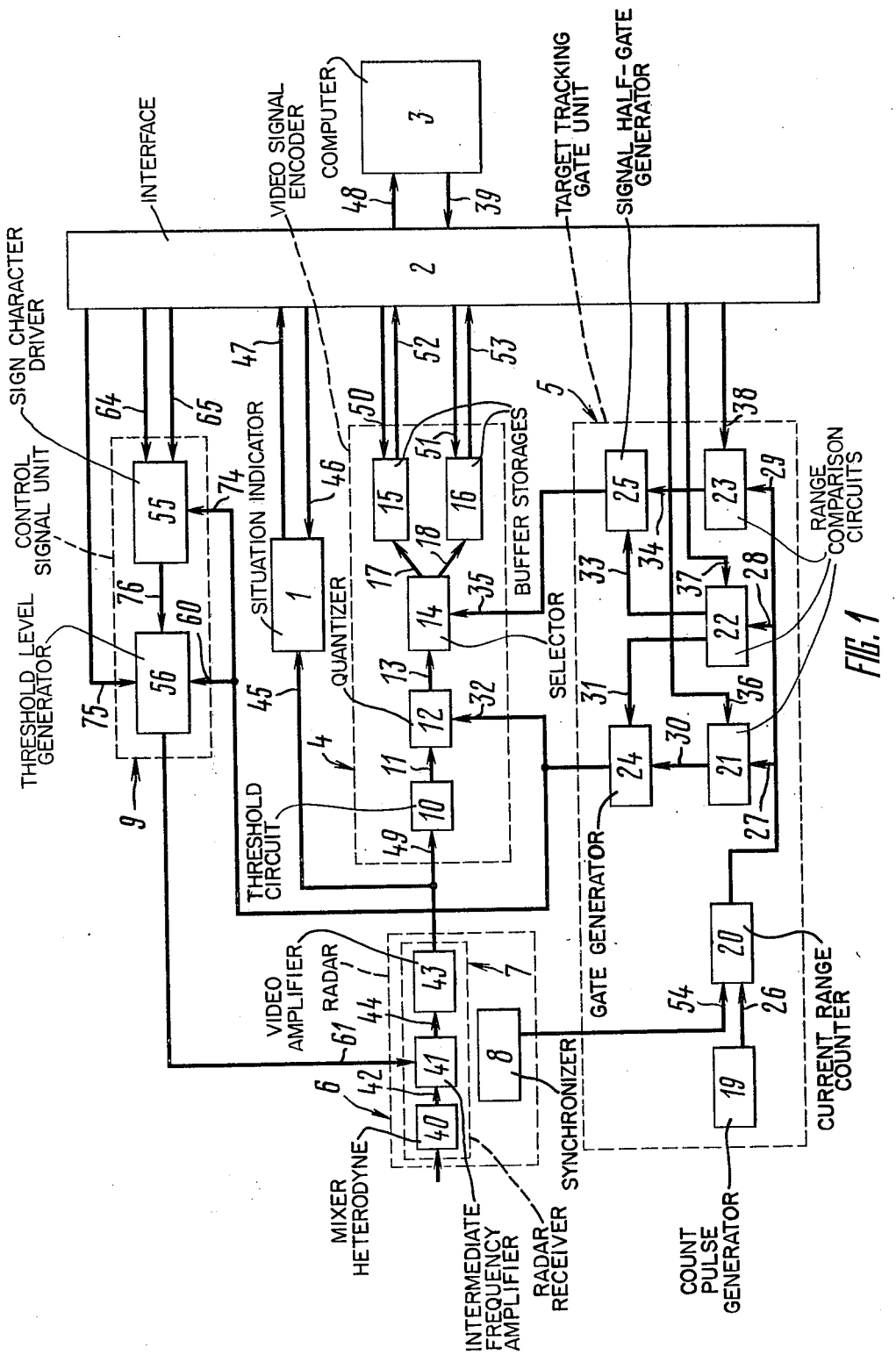
FIG. 1 is a block diagram of an automatic shipboard collision avoidance system, in accordance with the invention.

The automatic collision avoidance system of the invention comprises (FIG. 1) a situation indicator 1, an interface 2, a computer 3, a video signal encoder 4, a target tracking gate unit 5, radar 6 including a receiver 7 and a synchronizer 8, and a control signal unit 9 for generating control signals to control the gain of the receiver 7.

The video signal encoder 4 includes a threshold circuit 10 with an output connected to an input 11 of a quantizer 12 with an output connected to an input 13 of a selector 14. In addition the video signal encoder 4 has buffer storages 15 and 16, with inputs 17 and 18 connected to the outputs of the selector 14.

The target tracking gate unit 5 includes a count pulse generator 19, a target current range counter 20, range comparison circuits 21, 22 and 23, a gate generator 24, and a signal half-gate generator 25. The count pulse generator 19 has an output connected to an input 26 of the target current range counter 20. The counter 20 has an output connected to inputs 27, 28 and 29 of the range comparison circuits 21, 22, and 23, respectively. The gate generator 24 has an input 30 connected to the output of the range comparison circuit 21, an input 31 connected to a first output of the range comparison circuit 22, and an output connected to an input 32 of the quantizer 12. The signal half-gate generator 25 has an input 33 connected to a second output of the range comparison circuit 22, an input 34 connected to the output of the range comparison circuit 23, and an output connected to an input 35 of the selector 14. The range comparison circuits 21, 22 and 23 have respective inputs 36, 37 and 38 connected, through the interface 2, to an output 39 the computer 3.

The radar receiver 7 includes a mixer heterodyne 40, an intermediate frequency amplifier 41 having an input 42 connected to an output of the mixer heterodyne 40, and a video amplifier 43 having an input 44 connected to an output of the intermediate frequency amplifier 41.

The situation indicator 1 has an input 45 connected to the output of the video amplifier 43, an input 46 connected, through the interface 2, to the output 39 of the computer 3, and an output connected, through an input 47 of the interface 2, to an input 48 of the computer 3.

An input 49 of the threshold circuit 10 is connected to the output of the video amplifier 43. Inputs 50 and 51 of the buffer storages 15 and 16, respectively, are connected, through the interface 2, to the output 39 of the computer 3, and the outputs of the buffer storages 15 and 16 are connected, through inputs 52 and 53 of the interface 2, to the input 48 of the computer 3.

The synchronizer 8 has its output connected to an input 54 of the current range counter 20.

Figure 2:
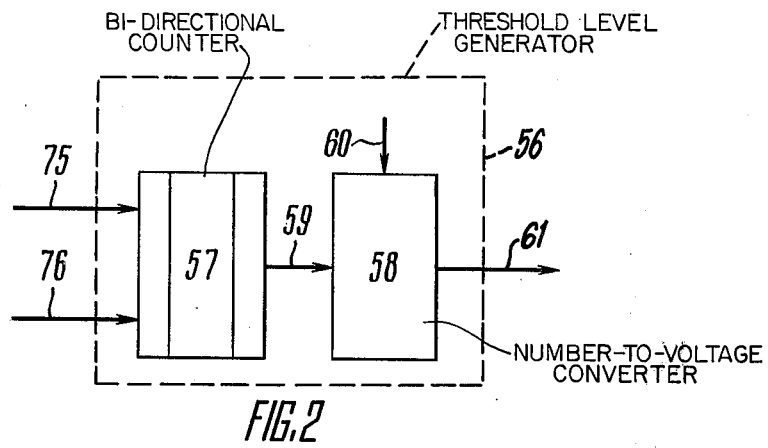
FIG. 2 is a block diagram of a threshold level generator, in accordance with the invention.

The control signal unit 9 includes a count pulse sign character driver 55 and a threshold level generator 56. The threshold level generator 56 has a bidirectional counter 57 (FIG. 2) and a number-to-voltage converter 58. The converter 58 has an input 59 connected to the output of the bidirectional counter 57, an input 60 connected to the output of the gate generator 24 of the target tracking gate unit 5, and an output connected to a control input 61 of the intermediate frequency amplifier 41.

Figure 3:
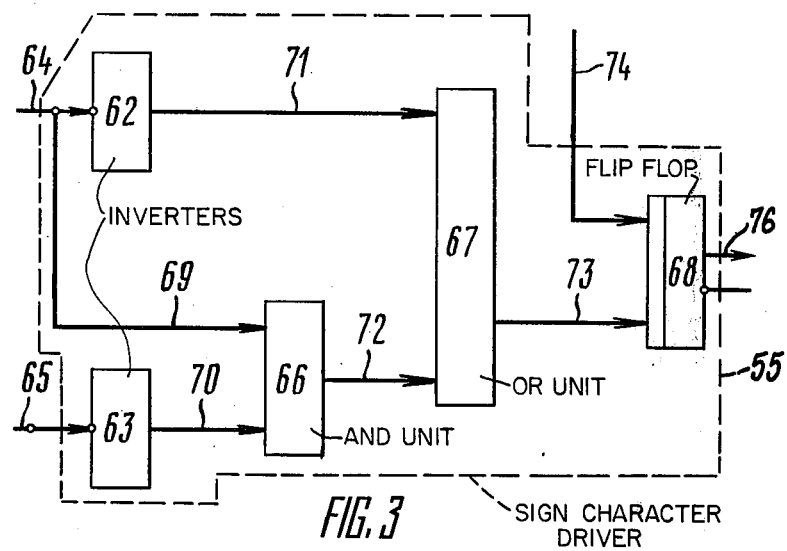
FIG. 3 is a block diagram of a count pulse sign character driver, in accordance with the invention.

The count pulse sign character driver 55 includes inverters 62 and 63 (FIG. 3) with their respective inputs 64 and 65, connected to outputs of the interface, an AND circuit 66, an OR circuit 67 and a flip-flop 68. An input 69 of the AND circuit 66 is connected to the input 64 of the inverter 62 and an input 70 of the AND circuit 66 is connected to the output of the inverter 63. Inputs 71 and 72 of the OR circuit 67 are connected to the output of the inverter 62 and to the output of the AND circuit 66, respectively. The flip-flop 68 has its inputs 73 and 74 connected to the output of the OR circuit 67 and to the output of the gate generator 24, respectively.

The bidirectional counter 57 has its counting input 75 connected, through the interface 2, to the output 39 of the computer 3 and its sign input 76 connected to the output of the flip-flop 68 of the count pulse sign character driver 55.

The automatic collision avoidance system operates as follows.

Targets to be tracked are entered by the operator from the situation indicator 1, through the interface 2, into the computer 3. An electronic cursor (not shown) is superimposed on the target blip on the screen (not shown) of the situation indicator 1 and the INPUT button (not shown) on the control console (not shown) of the situation indicator 1 is depressed. According to a control signal initiated by the INPUT button, the computer 3 generates codes corresponding to the beginning, the center and the end of the target tracking gate and, by means of the target tracking gate unit 5, controls the operation of the video signal encoder 4 and the control signal unit 9.

From the output of the radar receiver 7 the video signal is passed to the video signal encoder 4 where, within the target tracking gate in the threshold circuit 10 and the quantizer 12, analog video signals are converted into computer codes sent to the computer 3. The video signal code is recorded in the buffer storages 15 and 16. According to the signals delivered to the inputs 50 and 51 of the buffer storages 15, 16 from the computer 3, the video signal code recorded therein is passed through the inputs 52 and 53 of the interface 2 to the input 48 of the computer 3.

To provide for an optimum operation of the target tracking channel the probability of false alarms at its input (i.e., the probability of the appearance of noise at that input) should be kept at a minimum level. The probability of false alarms depends on the sea roughness, target range, angle of approach, tracking gate size and other factors and is not a constant value.

Controlling the gain of the radar receiver 7 in the target tracking gate is done in the following manner.

The value of the gain of the intermediate frequency amplifier 41 is divided into subdivisions. The target tracking gate is divided in azimuth into a noise and a signal half-gate. To this end, the current range counter 20 is reset at a zero target range by a zero range pulse applied to its input 54 from the synchronizer 8, and starts counting the range pulses applied to the input 26 from the count pulse generator 19. The current range code is delivered from the output of the current range counter 20 to the inputs 27, 28 and 29 of the range comparison circuits 21, 22 and 23, respectively, whose other inputs 36, 37 and 38 receive from the computer 3, through the interface 2, codes corresponding to the beginning, the end and the center of the target tracking gate. Using these codes, the range comparison circuit 21 generates the target tracking gate beginning pulse, the range comparison circuit 22 generates the target tracking gate end pulse and the circuit 23 generates the target tracking gate center pulse.

Using the target tracking gate beginning and end pulses, the gate generator 24 generates the target tracking gate. Using the target tracking gate center and end pulses, the signal half-gate generator 25 generates the signal half-gate. The absence of the signal half-gate at the input 35 of the selector 14 means that the noise half-gate is present. The noise half-gate is used to analyze the level of false alarms in the tracked target area. If a target echo is not present during the first scanning cycle, the gain of the intermediate frequency amplifier 41 is incremented by one subdivision in the signal half-gate. If a target echo is not present during the next scanning cycle, the gain of the intermediate frequency amplifier is incremented by one subdivision additionally.

These actions are repeated until a signal appears in the signal half-gate. When signals are present in both the noise and signal half-gates, the gain of the intermediate frequency amplifier 41 of the receiver 7 decreases in a like manner until the signal ceases in the noise half-gate. When a signal is present in the signal half-gate and is not present in the noise half-gate, the gain of the intermediate frequency amplifier 41 increases. The variation of the gain of the intermediate frequency amplifier 41 in the presence of a signal in the signal half-gate and in the presence or absence of it in the noise half-gate is accomplished until the probability of the false alarms in the noise-half gate P is set within the range of $P_1 \pm \Delta P$, where $P_1$ is the predetermined probability of the false alarms and $\Delta P$ is the allowable deviation of the false alarm probability from the predetermined value.

The inputs 64 and 65 of the control signal unit 9 receive, through the interface 2, information about the presence or absence of signals in the noise and signal half-gates. Using this information, the sign character driver 55 generates the sign character of the count pulses. This sign character is passed to the input 76 of the threshold level generator 56.

The threshold level generator 56 generates pulses to control the gain of the intermediate frequency amplifier 41 in the target tracking gate, the duration of these control signals being equal to the range size of the tracking gate and their amplitude being proportional to that gain of the intermediate frequency amplifier 41 which is predetermined for the next scanning cycle of the radar 6.

To fulfil these actions, the count input 75 of the bidirectional counter 57 at the end of the last range scan of the target tracking gate receives from the computer 3 a count pulse which, depending on the presence or absence of the sign character at the input 76 of the threshold level generator 56, increases or decreases the contents of the bidirectional counter 57 by 1. If the count pulse does not come, the contents of the bidirectional counter 57 remain unchanged.

The number-to-voltage converter 58 converts the code contained in the bidirectional counter 57 into a voltage whose amplitude is proportional to the gain of the intermediate frequency amplifier 41. The tracking gate, coming from the target tracking gate unit 5 to the input 60 of the converter 58, tends to limit the output voltage of the number-to-voltage converter 58 within the limits of the target tracking gate.

Controlling the gain of the intermediate frequency amplifier 41 of the radar receiver 7 is as follows.

During the first range scan of the target tracking gate, the gate generator 24 of the target tracking gate unit 5 sends through its output to the input 74 of the flip-flop 68 a control pulse which resets the flip-flop. The number-to-voltage converter 58 in accordance with the contents of the bidirectional counter 57 generates a control pulse for controlling the gain of the intermediate frequency amplifier 41 in the target tracking gate. This pulse comes to the control input 61 of the intermediate frequency amplifier 41 having a controllable gain and selects a value of the gain which is proportional to the code contained in the bidirectional counter 57.

The computer 3 analyzes in succession the video signal in the noise and signal half-gates and sends to the inputs 64 and 65 of the sign character driver 55 information which indicates whether or not signals are present in said half-gates.

At the same time, the computer 3 operates to determine the level of false alarms by counting the number of noise blips in the noise half-gate and sends or does not send a count pulse to the input 75 of the bidirectional counter 57, depending on the value of the level of false alarms determined.

The proposed automatic shipboard collision avoidance system provides for an increased noise immunity of automatic target tracking, thereby resulting in a decreased collision probability under unfavourable meteorological conditions and an increased safety of ship navigation.

What is claimed is:

1. An automatic shipboard collision avoidance system comprising:

radar including a radar receiver having an intermediate frequency amplifier with a controllable gain, said intermediate frequency amplifier having an input receiving input signals and a control input; and a synchronizer of said radar having an output;

a situation indicator connected to said radar receiver and receiving therefrom video signals carrying data on coordinates of surface objects;

an interface;

a computer to extract target echoes from clutter, to determine coordinates and motion parameters of targets and approach parameters related to the navigator's ship, to evaluate the possibility of collision and to send data on targets being tracked to said situation indicator, said computer being connected through said interface to said situation indicator;

a target tracking gate unit generating target tracking gates using coordinates supplied by said computer and comprising: a count pulse generator having an output; a current range counter having a first input connected to said output of said counter pulse generator, a second input connected to said output of said synchronizer, and an output; a first range comparison circuit having first and second inputs and an output; a second range comparison circuit having first and second inputs and first and second outputs; a third range comparison circuit having first and second inputs and an output, said first inputs of said range comparison circuits being connected to said output of said current range counter, said second inputs of said range comparison circuits being connected to said computer through said interface; a gate generator having a first input connected to said output of said first range comparison circuit, a second input connected to said first output of said second range comparison circuit, and an output; and a signal half-gate generator having a first input connected to said output of said third range comparison circuit, a second input connected to said second output of said second range comparison circuit, and an output;

a video signal encoder converting analog video signals into computer codes and comprising: a threshold circuit having an input connected to said radar receiver, and an output; a quantizer having a first input connected to said output of said gate generator, a second input connected to said output of said threshold circuit, and an output; a selector having a first input connected to said output of said quantizer, a second input connected to said output of said signal half-gate generator, and first and second outputs; and a first and a second buffer storage each having first and second inputs and an output, said first inputs of said buffer storages being connected to respective outputs of said selector, said second inputs and said outputs of said buffer storages being connected through said interface to said computer, said video signal encoder sending to said computer video signal codes from said output of said first buffer storage, in the absence of the signal half-gate, and from said output of said second buffer storage, in the presence of the signal half-gate; and a control signal unit for generating control signals to control the gain of said radar receiver, comprising: a sign character driver generating sign characters of count pulses and having first and second inputs connected through said interface to said computer, said sign character driver being fed with data from said computer on the presence of target echoes in the noise and signal half-gates, a third input connected to said output of said gate generator, and an output; and a threshold level generator comprising: a bidirectional counter having a counting input connected to said computer via said interface, a sign input connected to said output of said sign character driver, and an output, said bidirectional counter forming a control signal code proportional to the required gain of said intermediate frequency amplifier of said radar receiver in the target tracking gate using count pulses applied to said counting input, whose number is proportional to the required gain coefficient of said intermediate frequency amplifier of said radar receiver, and in accordance with the count pulse sign character; and a number-to-voltage converter having a first input connected to said output of said gate generator, a second input connected to said output of said bidirectional counter, said number-to-voltage converter being used to convert the code contained in said bidirectional counter into a voltage proportional to the required gain of the intermediate frequency amplifier of said radar receiver in the target tracking gate, and an output connected to said control input of said intermediate frequency amplifier.

2. An automatic shipboard collision avoidance system according to claim 2, wherein said sign character driver comprises: a first inverter having an input connected to said first input of said sign character driver, and an output;

a second inverter having an input connected to said second input of said sign character driver, and an output;

an AND unit having first and second inputs connected to said first input of said sign character driver and to said output of said second inverter, respectively, and an output;

an OR unit having first and second inputs connected to said outputs of said first inverter and to said output of said AND unit, respectively, and an output; and a flip-flop having first and second inputs connected to said output of said OR unit and to said third input of said sign character driver, respectively, and an output connected to said output of said sign character driver.

* * * * *